United States Patent
Sakamoto et al.

(10) Patent No.: US 6,950,955 B2
(45) Date of Patent: Sep. 27, 2005

(54) AUTOMATIC ADJUSTING METHOD AND CIRCUIT

(75) Inventors: Kazuaki Sakamoto, Tokyo (JP); Masatoshi Abe, Kanagawa (JP)

(73) Assignees: NEC Viewtechnology, Ltd., Tokyo (JP); NEC Mitsubishi Electric Visual Systems Corporation, Tokyo (JP)

( * ) Notice: Subject to any disclaimer, the term of this patent is extended or adjusted under 35 U.S.C. 154(b) by 714 days.

(21) Appl. No.: 10/053,772

(22) Filed: Jan. 24, 2002

(65) Prior Publication Data

US 2002/0104036 A1 Aug. 1, 2002

(30) Foreign Application Priority Data

Jan. 30, 2001 (JP) .................................... 2001-021600

(51) Int. Cl.⁷ ............................................... G09G 3/36
(52) U.S. Cl. ........................................ 713/400; 345/88
(58) Field of Search ............................ 713/400; 345/88

(56) References Cited

U.S. PATENT DOCUMENTS

| | | | | |
|---|---|---|---|---|
| 5,604,513 A | * | 2/1997 | Takahashi et al. | 345/589 |
| 2003/0016199 A1 | * | 1/2003 | Lee et al. | 345/88 |
| 2004/0061675 A1 | * | 4/2004 | Hirakawa et al. | 345/88 |

* cited by examiner

*Primary Examiner*—John R. Cottingham
(74) *Attorney, Agent, or Firm*—Sughrue Mion, PLLC

(57) ABSTRACT

When a communication speed of CPU 104 can be increased, a procedure of automatic phase adjustment involves setting phase shift amount CLK_DLY=n immediately after a vertical synchronization signal interrupt is generated, and reading video detection data VIDEO_DATA(n) after setting phase shift amount CLK_DLY=n+1 when the next vertical synchronization signal interrupt is generated. When CPU 104 is limited in the communication speed, the automatic adjustment is performed by an automatic adjusting circuit which has phase control data memory 107, video detection data memory 109, and a trigger input served by vertical synchronization signal S102.

3 Claims, 8 Drawing Sheets

AUTOMATIC ADJUSTING METHOD AND CIRCUIT

BACKGROUND OF THE INVENTION

1. Field of the Invention

The present invention relates to an automatic adjusting method and circuit.

2. Description of the Related Art

In one approach used for an automatic adjustment for a video sampling clock phase in a liquid crystal display device, phase control data is transmitted from a CPU, and then the CPU receives video detection data detected from an image sampled and displayed at a set phase value. This processing is repeated while the value is varied to determine an optimal phase value based on the received video detection data. The automatic phase adjustment requires a wait time which is the sum of a period taken for transmitting phase setting data, and period taken for displaying one screen of sampled image with a set phase value.

A prior art example of automatic phase adjustment will now be described with reference to FIGS. 1, 2 and 3.

FIG. 1 illustrates an exemplary circuit configuration for performing a conventional automatic phase adjustment; FIG. 2 illustrates an exemplary flow chart of the conventional automatic phase adjustment; and FIG. 3 illustrates an exemplary timing chart for the conventional automatic phase adjustment.

The illustrated circuit comprises A/D converter 101 for sampling analog video input signal V101 generated by a personal computer or the like with sampling pulse S107 to convert signal V101 to digital video signal V102; digital video signal processor 102 for performing a color correction and scaling processing on digital video signal V102; display unit 103 for displaying processed digital video signal V103; clock pulse generator 105 for generating clock pulse S105, with which an analog video signal is sampled from horizontal synchronization signal S101; phase controller 106 for controlling the phase of clock pulse S105; CPU 104 for controlling respective peripheral circuits, such as supplying clock pulse frequency control data S103 and phase control data S104; video detector 108 for calculating video detection data S106 from digital video signal V102 for use in an automatic adjustment, and for supplying video detection data S106 when triggered by vertical synchronization signal S102; and video detection data memory 109 for holding video detection data S106 and supplying video detection data S106 in response to a read operation of CPU 104.

Now, description will be made on the operation of the conventional automatic phase adjusting circuit. Assume in the following description that phase shift amount CLK_DLY has maximum value DLY_MAX, and the phase shifted by DLY_MAX+1 corresponds to a full one-cycle shift of the phase.

At step F701, phase shift amount CLK_DLY is set to zero. CPU 104 supplies phase controller 106 with phase control data S104 (CLK_DLY=0).

At step F702, CPU 104 waits for an interrupt of vertical synchronization signal S102 which serves as a trigger pulse. The flow proceeds to step F703 when an interrupt is generated.

At step F703, CPU 104 waits for an interrupt of vertical synchronization signal S102 which serves as a trigger pulse. The flow proceeds to step F704 when an interrupt is generated.

At step F704, CPU 104 confirms whether phase shift amount CLK_DLY has reached maximum value DLY_MAX. When the phase shift amount has reached the maximum value, the flow proceeds to step F707. Conversely, when the phase shift amount has not reached the maximum value, the flow proceeds to step F705.

At step F705, CPU 104 reads from video detection data memory 109 video detection data S106 (VIDEO_DATA(0)) when CLK_DLY=0. Read video detection data S106 is held in RAM, not shown, in CPU 104 as optimal phase determination data at each phase set value.

At step F706, CPU 104 supplies phase controller 106 with phase control data S104 (CLK_DLY=CLK_DLY+1=1). As step F706 terminates, the flow returns again to step F702. This loop of processing is repeated until the condition at step F704 is satisfied.

At step F707, CPU 104 reads from video detection data memory 109 video detection data S106 (VIDEO_DATA(DLY_MAX)) when CLK_DLY=DLY_MAX. At this time, CPU 104 acquires optimal phase determination data at each of phase set values from CLK_DLY=0 to DLY_MAX.

At step F708, CPU 104 analyzes the acquired optimal phase determination data at the respective phase set values to calculate an optimal phase value.

At step F709, CPU 104 supplies the calculated optimal phase value to phase controller 106 as phase control data S104. Phase controller 106 controls a phase delay amount for clock pulse S105 in accordance with phase control data S104, and supplies A/D converter 101 with phase-controlled clock pulse S105 as sampling pulse S107. Subsequently, the processing is performed in a manner similar to that in a normal display state to display a video sampled at the optimal phase on display unit 103.

A wait time required for the sequence of processing is calculated as (vertical synchronization period×(DLY_MAX+1)×2)).

The prior art example described above ensures a period for displaying one screen of image sampled at a set phase value by first setting phase shift amount CLK_DLY to zero and waiting for two interrupts of vertical synchronization signal S102 which serves as a trigger pulse, thereby giving rise to a problem of failing to reduce the wait time and requiring an excessive amount of time for the automatic adjustment.

In an approach used in the automatic adjustment for the phase of a video sampling clock in a liquid crystal display device for displaying a sampled analog video output signal generated by a personal computer or the like, phase control data is transmitted from a CPU, and then the CPU receives video detection data detected from an image sampled and displayed at a set phase value. This processing is repeated while the value is varied to determine an optimal phase value based on the received video detection data. A method of determining an optimal phase value may integrate luminance difference values between adjacent pixels for one screen, and utilize the integrated value. Any of conventional methods requires a wait time which is the sum of a period taken for transmitting phase setting data and a period taken for measuring one screen of image sampled at a set phase value. Generally, the vertical synchronization signal is used as an interrupt signal, and the wait time extends over two interrupts, so that a problem arises in that a lot of time is taken until the automatic adjustment is completed.

SUMMARY OF THE INVENTION

It is an object of the present invention to provide an automatic adjusting method and circuit which largely reduce a time required for an automatic adjustment.

The present invention provides an automatic adjusting method for use in an automatic phase adjustment, for example, in a liquid crystal display device, but not limited thereto, for largely reducing a time required for the automatic adjustment by transmitting phase setting data in a one screen wait period to streamline a processing procedure for the automatic adjustment. The present invention also provides an automatic adjusting method and circuit for largely reducing a time required for an automatic adjustment even if a CPU is limited in the communication speed by performing the automatic adjustment using the automatic adjusting circuit which has a phase control data memory, a video detection data memory, and a trigger input served by a vertical synchronization signal.

A CPU supplies phase control data (CLK_DLY=0) to the phase control data memory. Next, the CPU waits for a vertical synchronization signal which serves as a trigger pulse, and transfers phase control data (CLK_DLY=0) from the phase control data memory to phase controller when an interrupt is generated. The CPU supplies phase control data (CLK_DLY=1) to the phase control data memory.

Next, the CPU waits for an interrupt of the vertical synchronization signal which serves as a trigger pulse, and transfers phase control data (CLK_DLY=1) from the phase control data memory to the phase controller when the interrupt is generated. The video detector calculates data from one screen of video at CLK_DLY=0 for use in the automatic adjustment, and transfers video detection data (VIDEO_DATA(0)) at CLK_DLY=0 to the video detection data memory when the interrupt is generated.

Next, the CPU supplies phase control data (CLK_DLY= CLK_DLY+1=2) to the phase control data memory, and reads video detection data (VIDEO_DATA(0)) when CLK_DLY=CLK_DLY-2=0. The read video detection data is held in a RAM of the CPU as optimal phase determination data at each phase set value. The above processing is repeated until the phase shift amount CLK_DLY reaches the maximum value DLY_MAX, so that the CPU acquires optimal phase determination data at each of phase set values CLK_DLY=0 to DLY_MAX.

The CPU analyzes the optimal phase determination data at each of the phase set values to calculate an optimal phase-value, and supplies the calculated optimal phase value to the phase controller as phase control data, so that a video image sampled at the optimal phase is displayed on a display unit.

A first feature of the present invention lies in that when the communication speed of the CPU can be increased, a procedure of automatic phase adjustment involves setting phase shift amount CLK_DLY=n immediately after a vertical synchronization signal interrupt is generated, and reading video detection data VIDEO_DATA(n) after setting phase shift amount CLK_DLY=n+1 when the next vertical synchronization signal interrupt is generated.

A second feature of the present invention lies in that the automatic adjusting circuit has the phase control data memory, and a trigger input served by the vertical synchronization signal.

A third feature of the present invention lies in that the phase control data is supplied from the CPU to the phase control data memory in the automatic phase adjustment.

A fourth feature of the present invention lies in that phase control data is transferred from the phase control data memory to the phase controller upon generation of the vertical synchronization signal interrupt which serves as a trigger pulse.

The present invention has the following advantages.

A first advantage of the present invention is the ability to reduce a time required for the automatic adjustment without modifications to the circuit configuration, when the communication speed of the CPU can be increased, by the procedure of automatic phase adjustment which involves setting phase shift amount CLK_DLY=n immediately after a vertical synchronization signal interrupt is generated, and reading video detection data VIDEO_DATA(n) after setting phase shift amount CLK_DLY=n+1 when the next vertical synchronization signal interrupt is generated.

A second advantage of the present invention is the ability to reduce the time required for the automatic adjustment, even when the communication speed of the CPU cannot be increased, by the action of the automatic adjusting circuit which has the phase control data memory, video detection data memory, and trigger input served by the vertical synchronization signal.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS (First Embodiment of the Present Invention)

Figure 1:
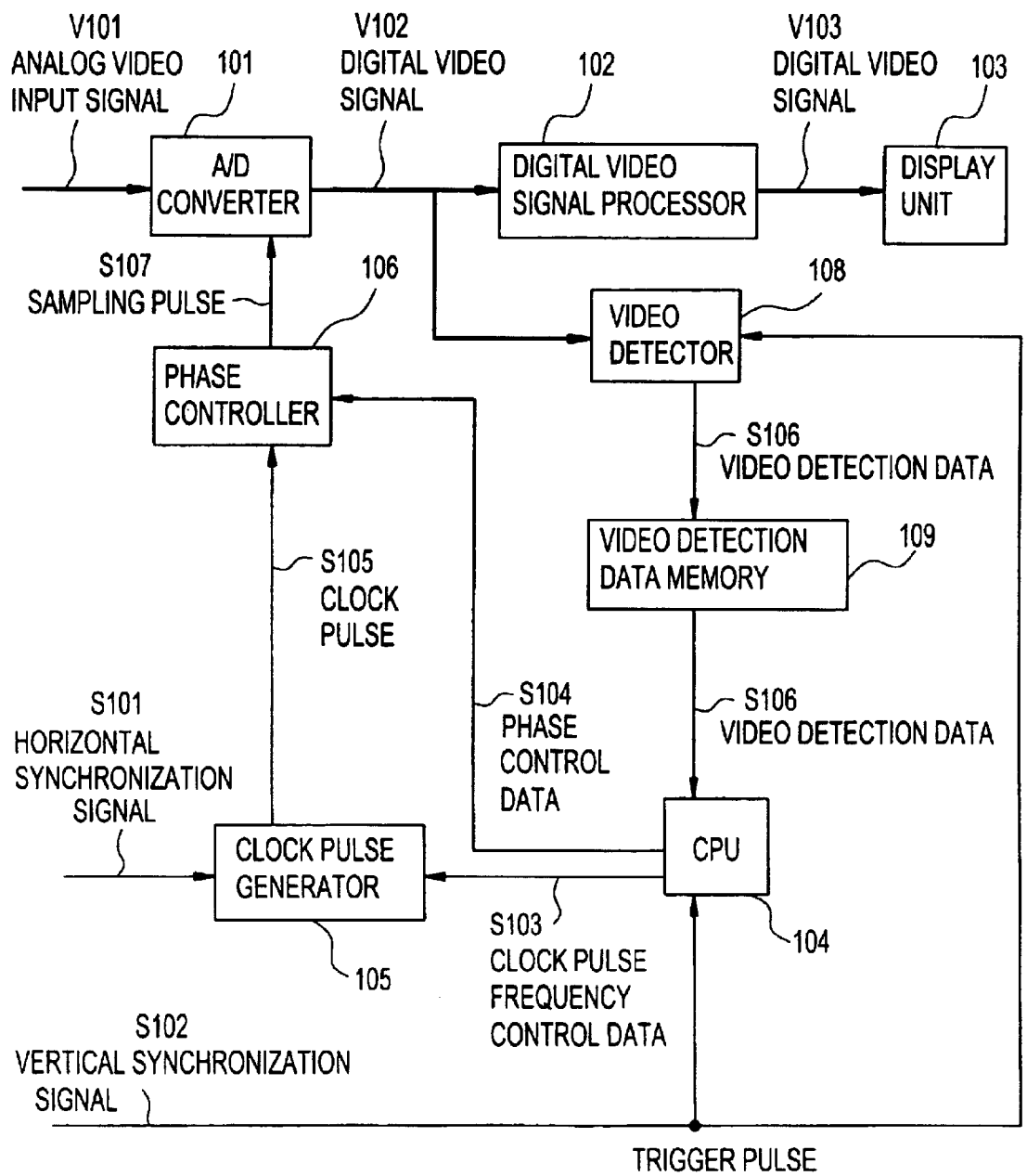
FIG. 1 is a block diagram illustrating an exemplary circuit configuration for performing a conventional automatic phase adjustment.
Figure 2:
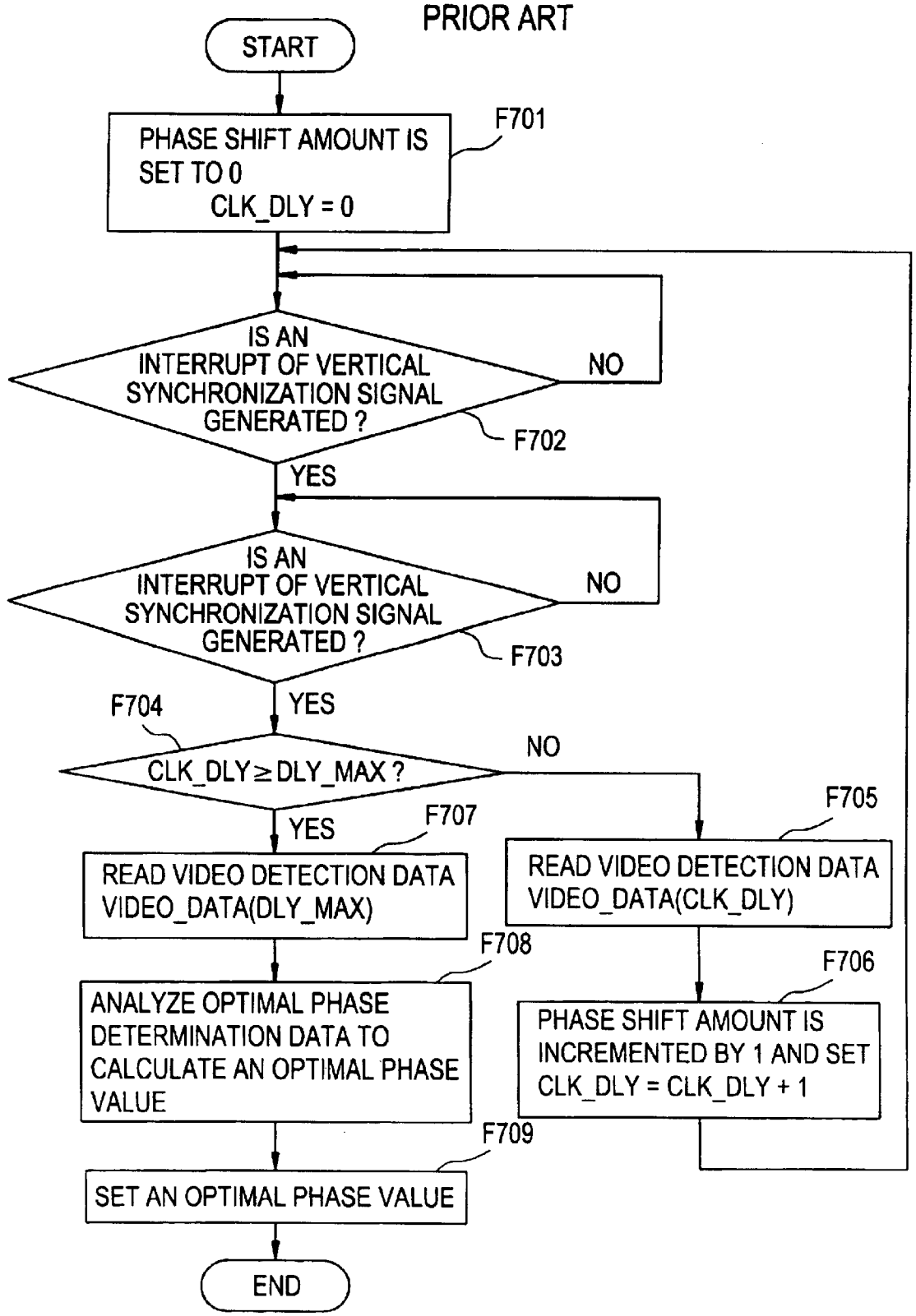
FIG. 2 is an exemplary flow chart illustrating the operation of the conventional automatic phase adjustment.
Figure 3:
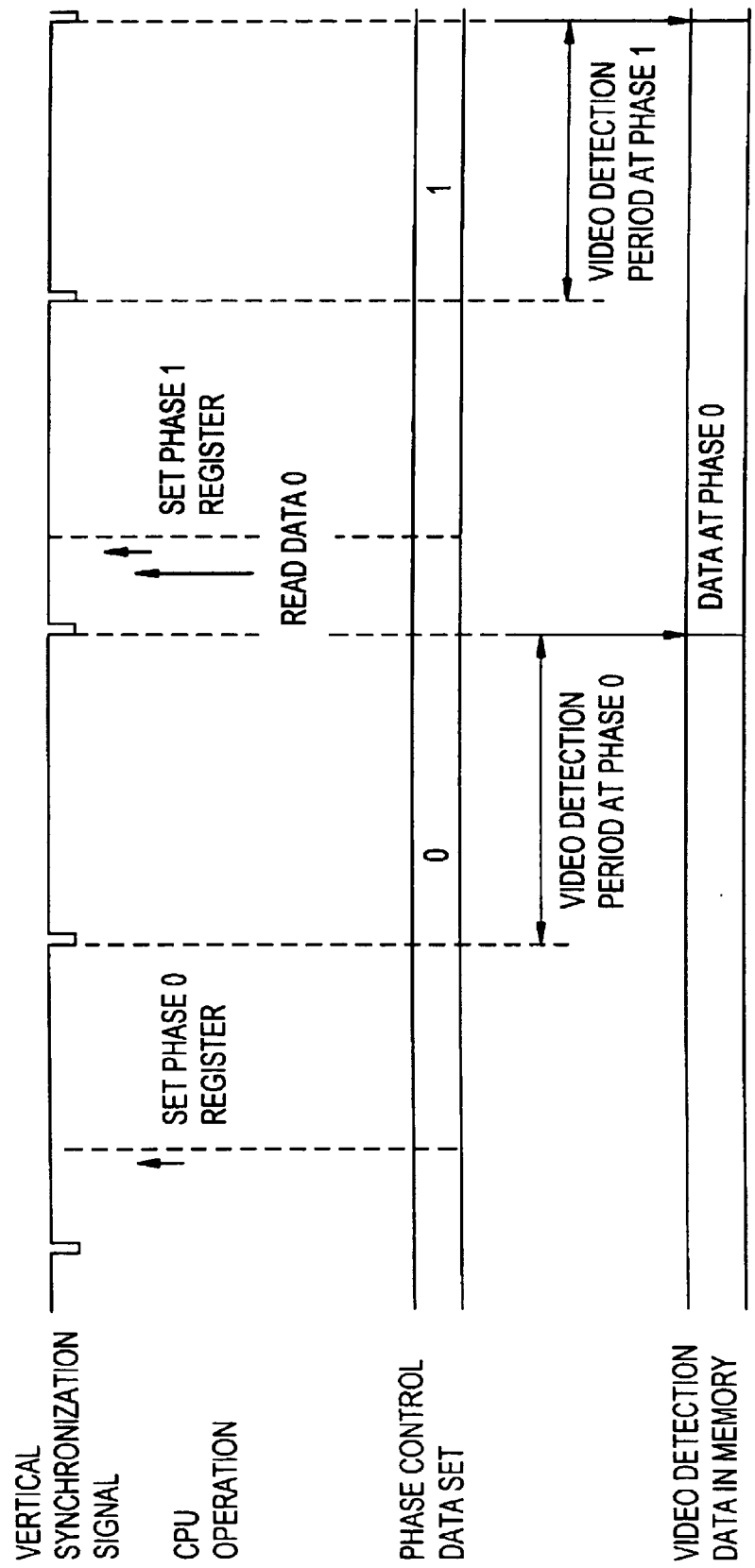
FIG. 3 is an exemplary timing chart illustrating the operation of the conventional automatic phase adjustment.

FIG. 1 illustrates an exemplary configuration of an automatic adjusting circuit according to a first embodiment of the present invention.

The illustrated automatic adjusting circuit comprises A/D converter 101 for sampling analog video input signal V101 generated by a personal computer or the like with sampling pulse S107 to convert signal V101 to digital video signal V102; digital video signal processor 102 for performing a color correction and scaling processing on digital video signal V102; display unit 103 for displaying processed digital video signal V103; clock pulse generator 105 for generating clock pulse S105, with which an analog video signal is sampled, from horizontal synchronization signal S101; phase controller 106 for controlling the phase of clock pulse S105; CPU 104 for controlling respective peripheral circuits, such as supplying clock pulse frequency control data S103 and phase control data S104; video detector 108 for calculating video detection data S106 from digital video signal V102 for use in an automatic adjustment, and for supplying video detection data S106 when triggered by vertical synchronization signal S102; and video detection data memory 109 for holding video detection data S106 and supplying video detection data S106 in response to a reading operation of CPU 104.

Next, the operation of the automatic adjusting circuit according to the first embodiment of the present invention will be described with reference to FIGS. 1, 4 and 5.

Figure 4:
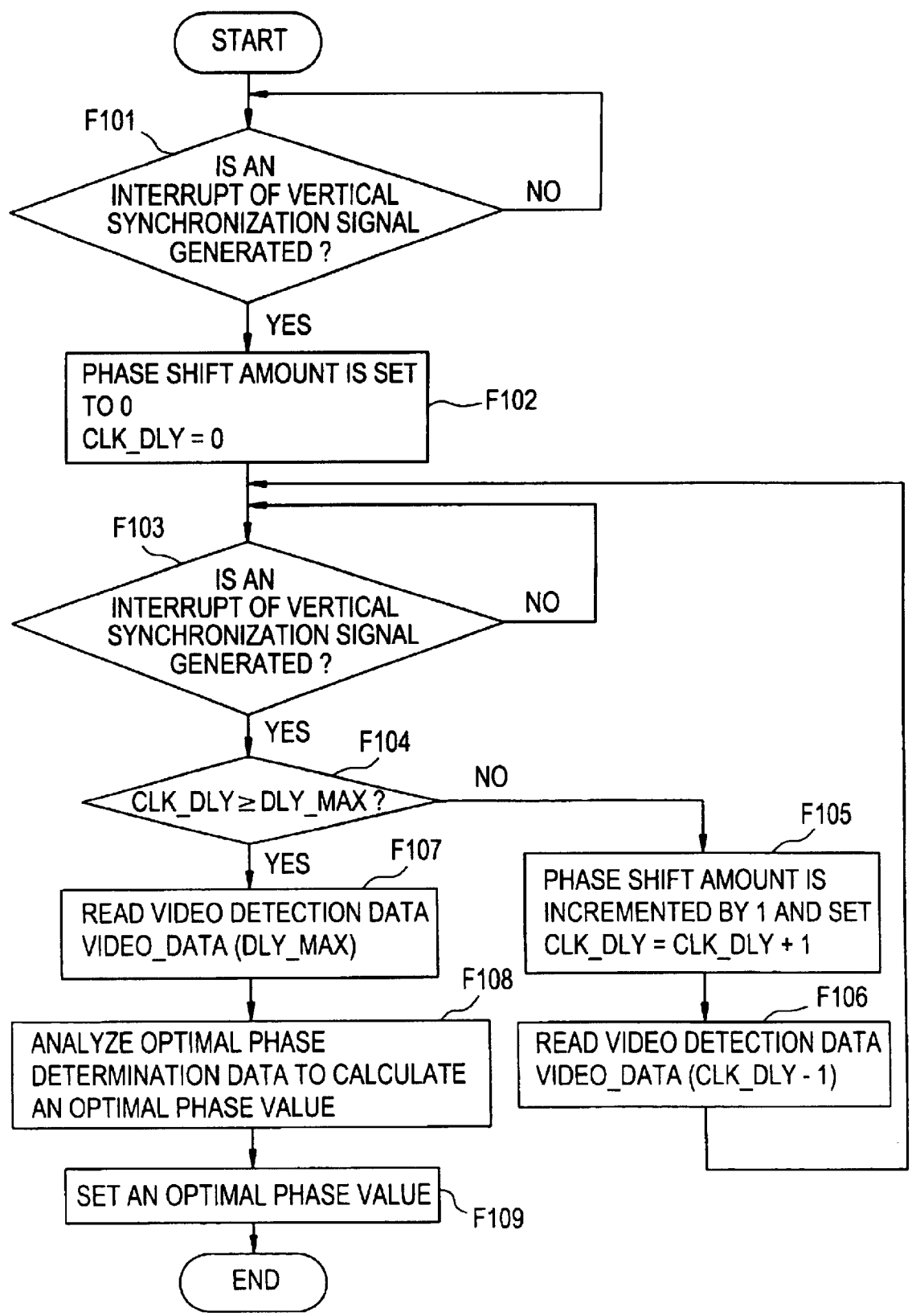
FIG. 4 is an exemplary flow chart illustrating the operation of an automatic phase adjustment performed by a circuit configuration according to a first embodiment of the present invention.
Figure 5:
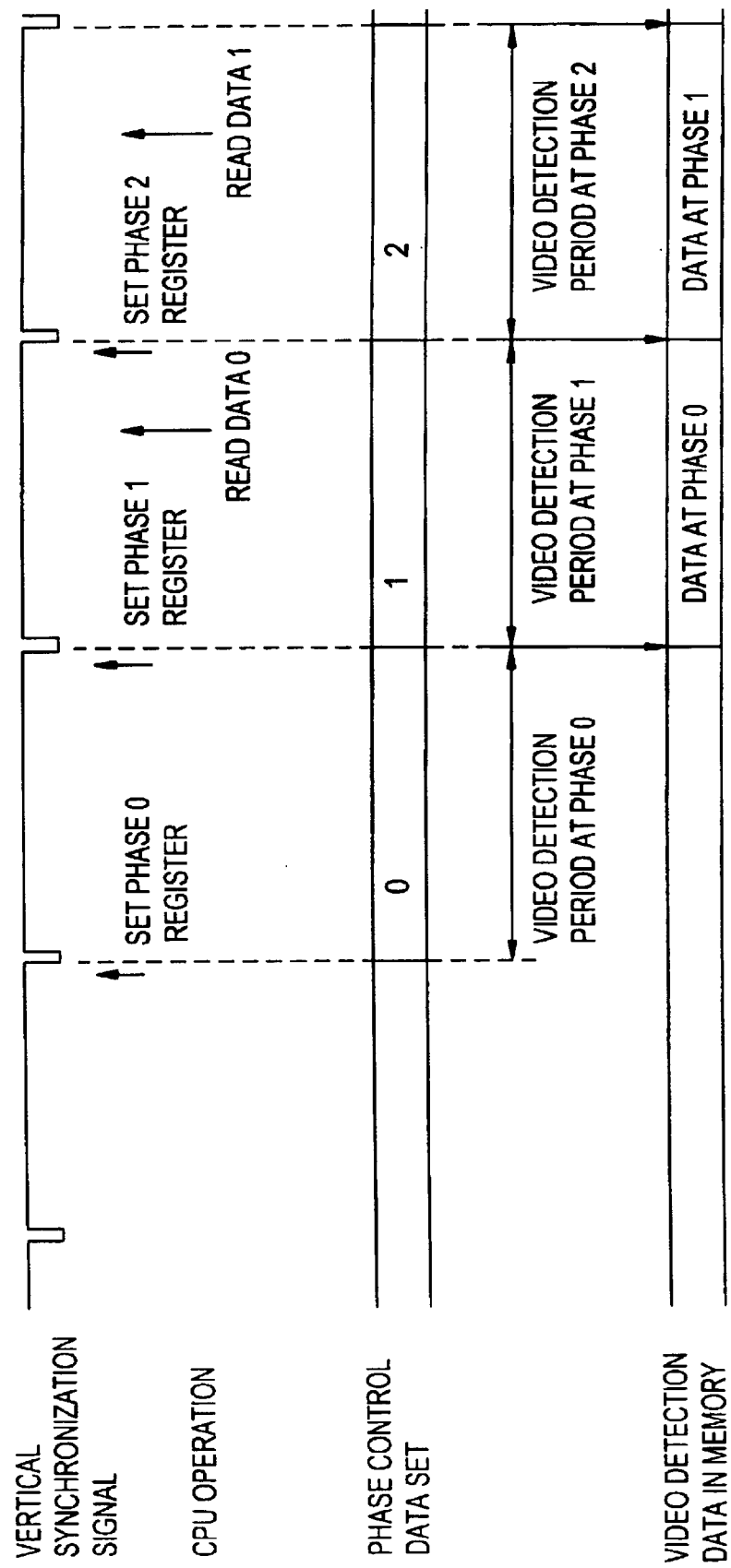
FIG. 5 is an exemplary timing chart illustrating the operation of the automatic phase adjustment performed by the circuit configuration according to the first embodiment of the present invention.

FIG. 4 is an exemplary flow chart illustrating an automatic phase adjustment according to the first embodiment of the present invention, and FIG. 5 is an exemplary timing chart illustrating the automatic phase adjustment according to the first embodiment of the present invention.

Described first is the operation of the circuit illustrated in FIG. 1 in a normal display state. CPU 104 supplies frequency control data S103 to clock pulse generator 105, and phase control data S104 to phase controller 106. Clock pulse generator 105 generates clock pulse S105 in accordance with frequency control data S103 with horizontal synchronization signal S101 used as a reference clock. Phase controller 106 controls a phase delay amount of clock pulse S105 in accordance with phase control data S104, and supplies phase-controlled clock pulse S105 to A/D converter 101 as sampling pulse S107. A/D converter 101 samples analog video input signal V101 with sampling pulse S107 to convert signal V101 to digital video signal V102 which is supplied to digital video signal processor 102. Digital video signal processor 102 performs a color correction, scaling processing and the like on digital video signal V102 to convert digital video signal V102 to digital video signal V103 for display on display unit 103. Eventually, digital video signal V103 is displayed on display unit 103 as a video.

Referring next to FIG. 4, described is the operation of the circuit illustrated in FIG. 1 when the automatic phase adjustment is performed. Assume in the following description that phase shift amount CLK_DLY has maximum value DLY_MAX, and the phase shifted by DLY_MAX+1 corresponds to a full one-cycle shift of the phase.

At step F101, CPU 104 waits for an interrupt of vertical synchronization signal S102 which serves as a trigger pulse. The flow proceeds to step F102 when an interrupt is generated.

At step F102, phase shift amount CLK_DLY is set to zero. CPU 104 supplies phase controller 106 with phase control data S104 (CLK_DLY=0).

At step F103, CPU 104 waits for an interrupt of vertical synchronization signal S102 which serves as a trigger pulse. The flow proceeds to step F104 when an interrupt is generated. A wait time at step F103 corresponds to one screen of video when CLK_DLY=0. Video detector 108 calculates data for use in the automatic adjustment from one screen of video at CLK_DLY=0, and transfers video detection data S106 (VIDEO_DATA(0)) when CLK_DLY=0 to video detection data memory 109 when an interrupt is generated.

At step F104, it is confirmed whether phase shift amount CLK_DLY has reached maximum value DLY_MAX. The flow proceeds to step F107 when the phase shift amount has reached the maximum value. Conversely, the flow proceeds to step F105, when the phase shift amount has not reached the maximum value.

At step F105, CPU 104 increments phase shift amount CLK_DLY by one and sets the incremented value. CPU 104 supplies phase controller 106 with phase control data S104 (CLK_DLY=CLK_DLY+1=1).

At step F106, CPU 104 reads from video detection data memory 109 video detection data S106 (VIDEO_DATA(0)) when $CLK\_DLY=CLK\_DLY-1=0$. Read video detection data S106 is held in RAM, not shown, in CPU 104 as optimal phase determination data at each phase set value. The flow returns again to step F103 upon termination of step F106. This loop of processing is repeated until the condition at step F104 is satisfied.

At step F107, CPU 104 reads from video detection data memory 109 video detection data S106 (VIDEO_DATA (DLY_MAX)) when CLK_DLY=DLY_MAX. At this time, CPU 104 acquires optimal phase determination data at each of phase set values from CLK_DLY=0 to DLY_MAX.

At step F108, CPU 104 analyzes the acquired optimal phase determination data at the respective phase set values to calculate an optimal phase value.

At step F109, CPU 104 supplies the calculated optimal phase value to phase controller 106 as phase control data S104. Phase controller 106 controls a phase delay amount for clock pulse S105 in accordance with phase control data S104, and supplies A/D converter 101 with phase-controlled clock pulse S105 as sampling pulse S107. Subsequently, the processing is performed in a manner similar to that in a normal display state to display a video sampled at the optimal phase on display unit 103.

A wait time required for the sequence of processing is calculated as (vertical synchronization period ×(DLY_MAX+1)+1)).

As appreciated from the foregoing, the wait time can be reduced substantially to one half by performing the automatic phase adjustment using the automatic adjusting method according to the first embodiment of the present invention.

In the first embodiment of the present invention, the video detector should be supplied with a digital video signal sampled in the A/D converter with a phase-varied sampling pulse, under the condition that the sum of a time taken for transmitting phase control data from the CPU to the phase controller in response to a generated interrupt and a time taken for the phase controller to control the phase of the sampling pulse and supply the sampling pulse must be shorter than the sum of the vertical synchronization pulse duration and a video back porch period. 10 Generally, the time taken for the phase controller to control the phase of the sampling pulse and supply the sampling pulse is extremely short, i.e., less than one horizontal synchronization period, so that the foregoing condition is largely affected by the time taken for transmitting the phase control data from the CPU to the phase controller. A system which cannot increase a communication speed of a CPU would not be compatible with the automatic adjusting method according to the first embodiment of the present invention.

As a method of solving the problem inherent in the first embodiment of the present invention, the following description will be centered on an automatic phase adjusting method, as a second embodiment, which employs an automatic adjusting circuit having a phase control data memory, a video detection data memory, and a trigger input for receiving the vertical synchronization signal, for use with a system which cannot increase a communication speed.

(Second Embodiment of the Present Invention)

Figure 6:
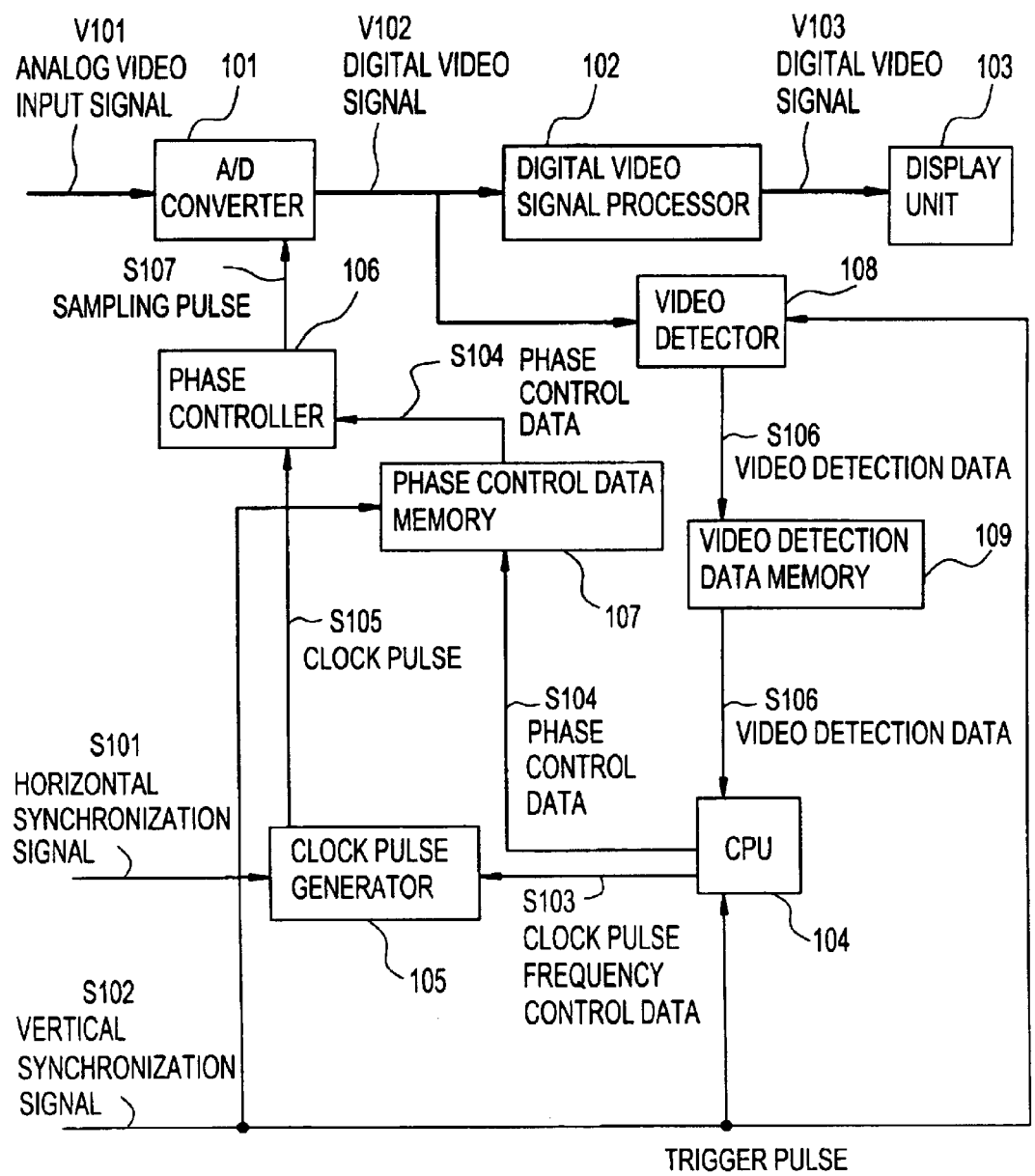
FIG. 6 is a block diagram illustrating the circuit configuration according to a second embodiment of the present invention.

FIG. 6 illustrates an exemplary configuration of an automatic adjusting circuit according to a second embodiment of the present invention for largely reducing a time required for the automatic adjustment.

The illustrated circuit comprises A/D converter 101 for sampling analog video input signal V101 with sampling pulse S107 to convert signal V101 to digital video signal V102; digital video signal processor 102 for performing a color correction and scaling processing on digital video signal V102; display unit 103 for displaying processed digital video signal V103; clock pulse generator 105 for generating clock pulse S105, with which an analog video signal is sampled, from horizontal synchronization signal S101; phase controller 106 for controlling the phase of clock pulse S105; CPU 104 for controlling respective peripheral circuits, such as supplying clock pulse frequency control data S103 and phase control data S104; phase control data memory 107 for holding phase control data S104 from CPU 104, and for transferring phase control data S104 to phase controller 106 when triggered by vertical synchronization signal S102; video detector 108 for calculating video detection data S106 from digital video signal V102 for use in an automatic adjustment, and for supplying video detection data S106 when triggered by vertical synchronization signal S102; and video detection data memory 109 for holding video detection data S106 and supplying video detection data S106 in response to a reading operation of CPU 104.

Next, the operation of the automatic adjusting circuit according to the second embodiment of the present invention will be described with 25 reference to FIGS. 6, 7 and 8.

Figure 7:
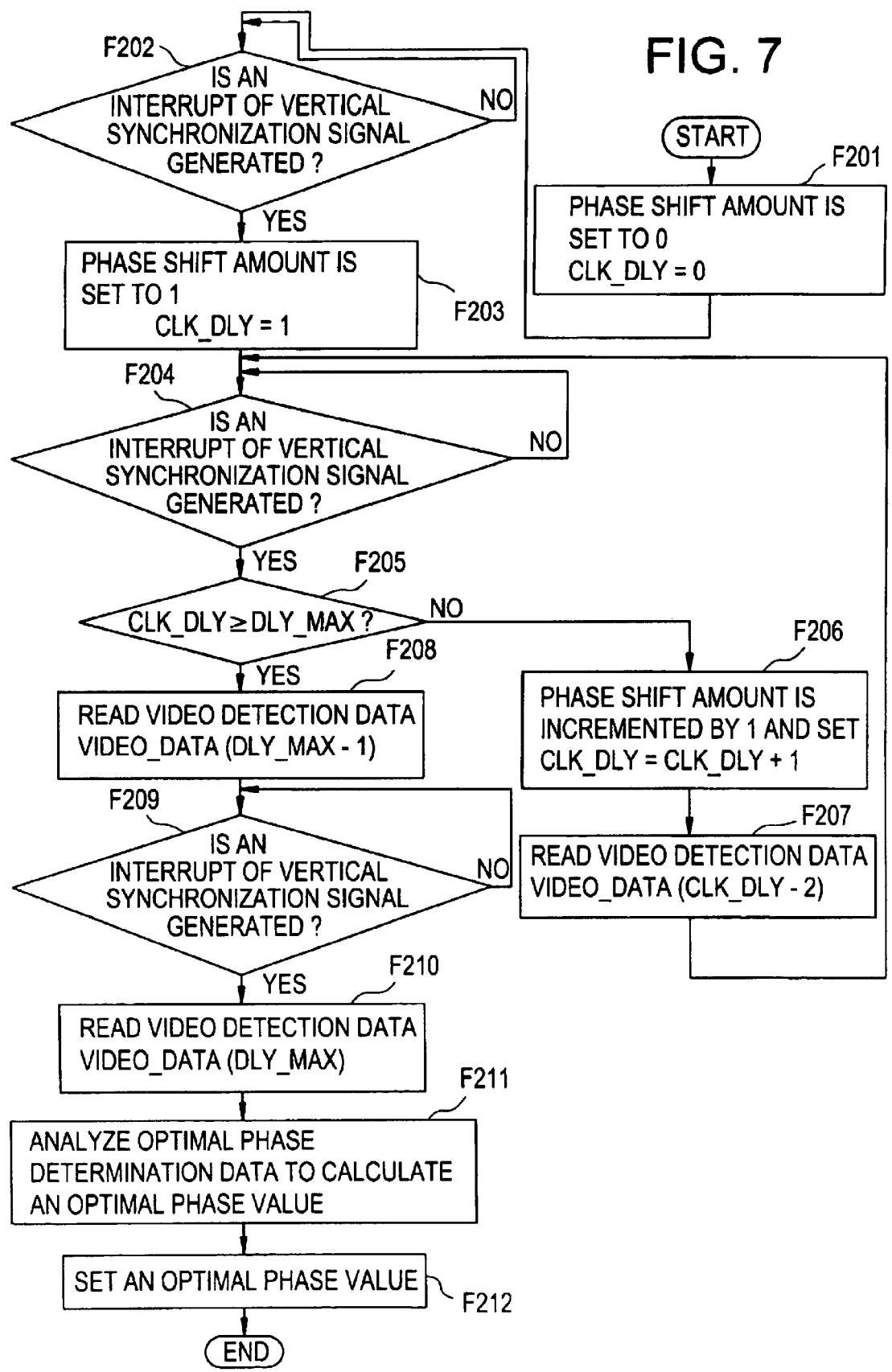
FIG. 7 is an exemplary flow chart illustrating the operation of an automatic phase adjustment performed by the circuit configuration according to the second embodiment of the present invention.
Figure 8:
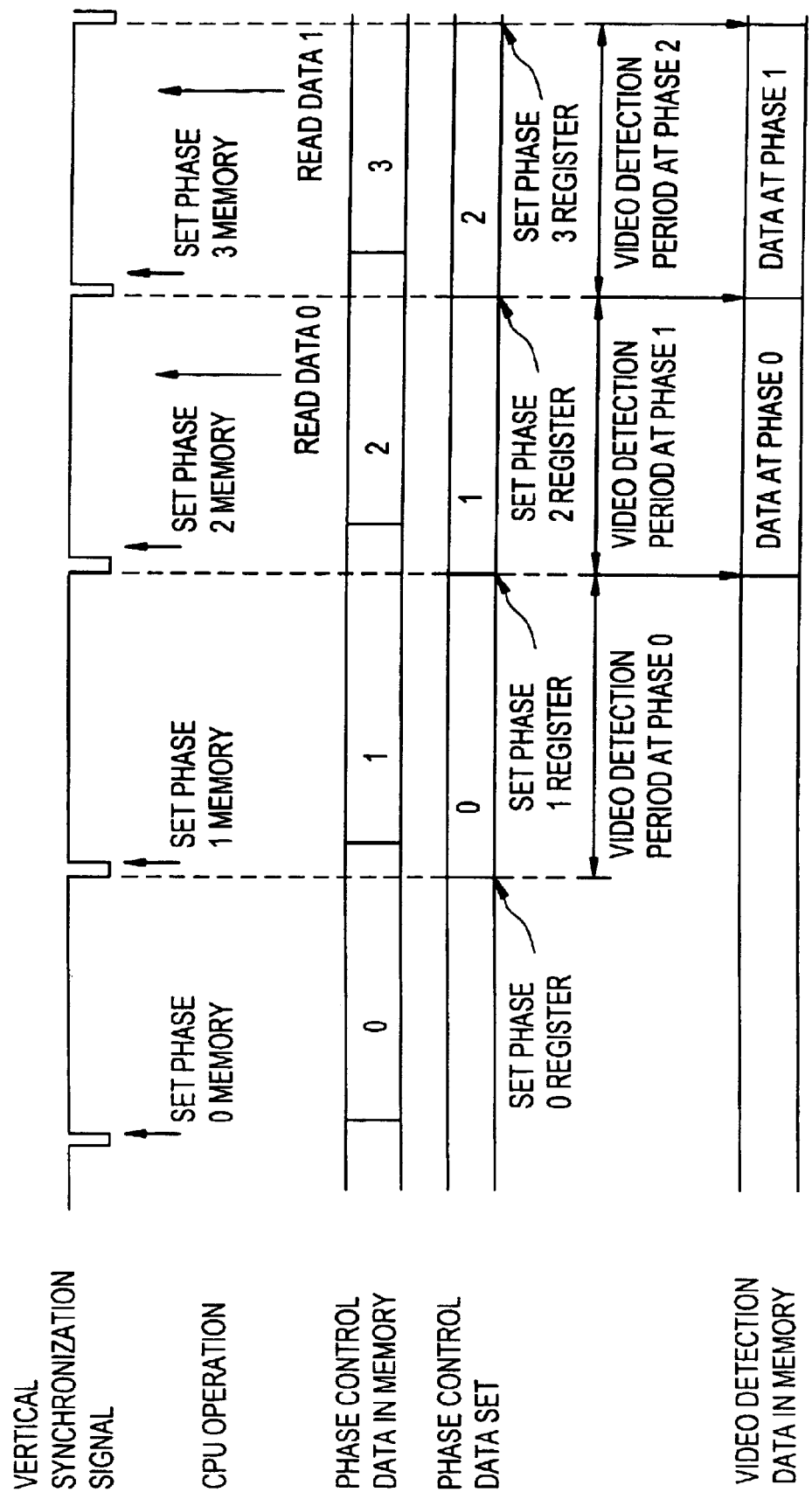
FIG. 8 is an exemplary timing chart illustrating the operation of the automatic phase adjustment performed by the circuit configuration according to the second embodiment of the present invention.

FIG. 7 is an exemplary flow chart of an automatic phase adjustment performed using the circuit configuration according to the second embodiment of the present invention, and FIG. 8 is an exemplary timing chart of the automatic phase adjustment performed using the circuit configuration according to the second embodiment of the present invention.

Described first is the operation of the circuit illustrated in FIG. 6 in a normal display state. CPU 104 supplies frequency control data S103 to clock pulse generator 105, and phase control data S104 to phase controller 106 through phase control data memory 107. Clock pulse generator 105 generates clock pulse S105 in accordance with frequency control data S103, using horizontal synchronization signal S101 as a reference clock. Phase controller 106 controls a phase delay amount for clock pulse S105 in accordance with phase control data S104, and supplies the phase-controlled clock pulse S105 to A/D converter 101 as sampling pulse S107. A/D converter 101 samples analog video input signal V101 with sampling pulse S107 to convert signal V101 to digital video signal V102 which is supplied to digital video signal processor 102. Digital video signal processor 102 performs a color correction, a scaling processing and the like on digital video signal V102 to convert digital video signal V102 to digital video signal V103 for display on display unit 103. Eventually, digital video signal V103 is displayed on display unit 103 as a video image.

Referring next to FIG. 7, described is the operation of the circuit illustrated in FIG. 6 when the automatic phase adjustment is performed. Assume in the following description that phase shift amount CLK_DLY has maximum value DLY_MAX, and the phase shifted by DLY_MAX+1 corresponds to a full one-cycle shift of the shift.

At step F201, phase shift amount CLK_DLY is set to zero. CPU 104 supplies phase control data memory 107 with phase control data S104 (CLK_DLY=0).

At step F202, CPU 104 waits for an interrupt of vertical synchronization signal S102 which serves as a trigger pulse. As an interrupt is generated, phase control data memory 107 transfers phase control data S104 (CLK_DLY=0) to phase controller 106.

At step F203, phase shift amount CLK_DLY is set to one. CPU 104 supplies phase control data memory 107 with phase control data S104 (CLK_DLY=0).

At step F204, CPU 104 waits for an interrupt of vertical synchronization signal S102 which serves as a trigger pulse. As an interrupt is generated, phase control data memory 107 transfers phase control data S104 (CLK_DLY=1) to phase controller 106. A wait period at step F204 corresponds to one screen of video at CLK_DLY=0. Video detector 108 calculates data from one screen of video at CLK_DLY=0 for use in the automatic adjustment, and transfers video detection data S106 (VIDEO_DATA(0)) when CLK_DLY=0 to video detection data memory 109 when an interrupt is generated.

At step F205, it is confirmed whether phase shift amount CLK_DLY has reached maximum value DLY_MAX. When the phase shift amount has reached the maximum value, the flow proceeds to step F208. Conversely, when the phase shift amount has not reached the maximum value, the flow proceeds to step F206.

At step F206, CPU 104 increments phase shift amount CLK_DLY by one and sets the incremented phase shift amount. CPU 104 supplies phase controller 106 with phase control data S104 (CLK_DLY=CLK_DLY+1=2).

At step F207, CPU 104 reads from video detection data memory 109 video detection data S106 (VIDEO_DATA(0)) when CLK_DLY-2=0. Read video detection data S106 is held in RAM, not shown, in CPU 104 as optimal phase determination data at each phase set value. As step F207 terminates, the flow returns again to step F204. This loop of processing is repeated until the condition at step F205 is satisfied.

At step F208, CPU 104 reads from video detection data memory 109 video detection data S106 (VIDEO_DATA (DLY_MAX-1)) when CLK_DLY=DLY_MAX-1. A wait time at step F209 corresponds to one screen of video at CLK_DLY=DLY_MAX. Video detector 108 calculates data for use in the automatic adjustment from one screen of video at CLK_DLY=DLY_MAX, and transfers video detection data S106 (VIDEO_DATA(DLY_MAX)) when CLK_DLY=DLY_MAX to video detection data memory 109 when an interrupt is generated.

At step F210, CPU 104 reads from video detection data memory 109 video detection data S106 (VIDEO_DATA (DLY_MAX)) when CLK_DLY=DLY_MAX. At this time, CPU 104 acquires optimal phase determination data at each of phase set values from CLK_DLY=0 to DLY_MAX.

At step F211, CPU 104 analyzes the acquired optimal phase determination data at the respective phase set values to calculate an optimal phase value.

At step F212, CPU 104 supplies the calculated optimal phase value to phase controller 106 through phase control data memory 107 as phase control data S104. Phase controller 106 controls a phase delay amount for clock pulse S105 in accordance with phase control data S104, and supplies A/D converter 101 with phase-controlled clock pulse S105 as sampling pulse S107. Subsequently, the processing is performed in a manner similar to that in a normal display state to display a video sampled at the optimal phase on display unit 103.

A wait time required for the sequence of processing is calculated as (vertical synchronization period ×(DLY_MAX+1)+2)).

In the foregoing manner, with the addition of phase control data memory for holding phase control data supplied to phase controller 106, the phase control data can be previously transmitted even when the communication speed of CPU 104 cannot be increased. Since the sum of a time required for transferring the phase control data to phase controller 106 after the vertical synchronization signal interrupt and a time required for phase controller 106 to control the phase of the sampling pulse and supply the phase-controlled sampling pulse is sufficiently shorter than the sum of the vertical synchronization pulse duration and video back porch period, the wait time can be reduced to approximately one half, as is the case with the first embodiment.

While in the foregoing embodiments, the vertical synchronization signal is used as the interrupt signal, an interrupt signal generated by a CPU, and the like may be used instead.

Also, while the foregoing embodiments have been described for an automatic phase adjustment in a liquid crystal display device, the present invention is not limited to the automatic phase adjustment in a liquid crystal display device or even the automatic adjustment, but may be used in any system which performs data processing that requires a predetermined wait time and repeated data sampling.

While a preferred embodiment of the present invention has been described using specific terms, such description is for illustrative purposes only, and it is to be understood that changes and variations may be made without departing from the spirit or scope of the following claims.

What is claimed is:

1. An automatic adjusting method, wherein a phase shift amount CLK_DLY has a maximum value DLY_MAX, and a phase shift amount DLY_MAX+1 corresponds to a full-cycle shift of phase, said method comprising:
    a first step of waiting for an interrupt of a vertical synchronization signal which serves as a trigger pulse, and transitioning to a next step when the interrupt is generated;
    a second step of setting the phase shift amount CLK_DLY to zero, and supplying phase control data (CLK_DLY=0) to a phase controller by a CPU;
    a third step of waiting for an interrupt of the vertical synchronization signal which serves as a trigger pulse, and transitioning to a fourth step when the interrupt is generated, wherein a video detector calculates data from one screen of video at CLK_DLY for use in an automatic adjustment, and transfers video detection data (VIDEO_DATA(CLK_DLY)) at CLK_DLY to a video detection data memory when the interrupt is generated;
    a fourth step of confirming whether the phase shift amount CLK_DLY has reached the maximum value DLY_MAX, transitioning to a seventh step when the phase shift amount has reached the maximum value, and transitioning to a fifth step when the phase shift amount has not reached the maximum value;
    a fifth step of incrementing the phase shift amount CLK_DLY by one and setting the incremented phase shift amount, and supplying the phase control data (CLK_DLY=CLK_DLY+1) from said CPU to said phase controller;
    a sixth step of reading video detection data (VIDEO_DATA(CLK_DLY−1)) from said video detection data memory by said CPU, holding the read video detection data in a RAM of said CPU as optimal phase determination data at each phase set value, and returning again to said third step when a processing at this sixth step is completed;
    processings from said third step to said sixth step being repeated until a condition at said fourth step is satisfied;
    a seventh step of reading video detection data (VIDEO_DATA(DLY_MAX)) when CLK_DLY=DLY_MAX from said video detection data memory by said CPU, said CPU acquiring optimal phase determination data at each of phase set values CLK_DLY=0 to DLY_MAX;
    an eighth step of analyzing, by said CPU, the optimal phase determination data at each of the phase set values to calculate an optimal phase value; and
    a ninth step of supplying the calculated optimal phase value from said CPU to said phase controller as phase control data, wherein said phase controller controls a phase delay amount for a clock pulse in accordance with the phase control data, supplies the phase-controlled clock pulse to an A/D converter as a sampling pulse, such that said A/D converter samples an analog video input signal at an optimal phase to convert the analog video input signal to a digital video signal, said digital video signal being supplied to a digital video signal processor, said digital video signal processor performing a color correction and a scaling processing on the digital video signal to convert the digital video signal to a digital video signal for display on a display unit, said display unit displaying the digital video signal as a video.

2. An automatic adjusting circuit comprising:
    an A/D converter for sampling an analog video input signal with a sampling pulse to convert the analog video input signal to a digital video signal;
    a digital video signal processor for performing a color correction and a scaling processing on the digital video signal;
    a display unit for displaying the signal processed digital video signal;
    a clock pulse generator for generating a clock pulse from a horizontal synchronization signal, said analog video input signal being sampled with said clock pulse;
    a phase controller for controlling a phase of said clock pulse;
    a CPU for supplying frequency control data and phase control data for said clock pulse, and for controlling respective peripheral circuits;
    a phase control data memory for holding the phase control data from said CPU, said phase control data memory being triggered by a vertical synchronization signal to transfer the phase control data to said phase controller;
    a video detector for calculating video detection data for use in an automatic adjustment from the digital video signal, said video detector being triggered by the vertical synchronization signal to supply the video detection data; and
    a video detection data memory for holding the video detection data, and supplying the video detection data in response to a reading operation of said CPU.

3. An automatic adjusting method, wherein a phase shift amount CLK_DLY has a maximum value DLY_MAX, and a phase shift amount DLY_MAX+1 corresponds to a full-cycle shift of phase, said method comprising:
    a first step of setting the phase shift amount CLK_DLY to zero, and supplying phase control data (CLK_DLY=0) to a phase control data memory by a CPU;
    a second step of waiting for an interrupt of a vertical synchronization signal which serves as a trigger pulse, and transferring phase control data (CLK_DLY=0)

from said phase control data memory to a phase controller when the interrupt is generated;

a third step of setting the phase-shift amount CLK_DLY to one, and supplying phase control data (CLK_DLY=1) to said phase control data memory by said CPU;

a fourth step of waiting for an interrupt of the vertical synchronization signal which serves as a trigger pulse, and transferring phase control data (CLK_DLY) from said phase control data memory to said phase controller when the interrupt is generated, wherein a video detector calculates data for use in an automatic adjustment from one screen of video at CLK_DLY-1, and transfers video detection data (VIDEO_DATA(CLK_DLY-1)) to a video detection data memory when the interrupt is generated;

a fifth step of confirming whether the phase shift amount CLK_DLY has reached the maximum value DLY_MAX, transitioning to an eighth step when the phase shift amount has reached the maximum value, and transitioning to a sixth step when the phase shift amount has not reached the maximum value;

a sixth step of incrementing the phase shift amount CLK_DLY by one and setting the incremented phase shift amount, and supplying the phase control data (CLK_DLY=CLK_DLY+1) to said phase control data memory by said CPU;

a seventh step of reading video detection data (VIDEO_DATA(CLK+DLY-2)) from said video detection data memory, holding the read video detection data in a RAM of said CPU as optimal phase determination data at each phase set value, returning again to said fourth step when a processing at this seventh step is completed;

processings from said fourth step to said seventh step being repeated until a condition at said fifth step is satisfied;

an eighth step of reading video detection data (VIDEO_DATA(DLY_MAX-1)) when CLK_DLY=DLY_MAX-1 from said video detection data memory by said CPU;

a ninth step of waiting for an interrupt of the vertical synchronization signal which serves as a trigger pulse, wherein said video detector calculates data for use in automatic adjustment from one screen of video at CLK_DLY=DLY_MAX, and transfers video detection data (VIDEO_DATA(DLY_MAX) when CLK_DLY=DLY_MAX to said video detection data memory when the interrupt is generated;

a tenth step of reading video detection data (VIDEO_DATA(DLY_MAX) when CLK_DLY=DLY_MAX from said video detection data memory by said CPU, said CPU acquiring optimal phase determination data at each of phase set values CLK_DLY=0 to DLY_MAX;

an eleventh step of analyzing by said CPU the acquired optimal phase determination data at each of the phase set values to calculate an optimal phase value; and a twelfth step of supplying the calculated optimal phase value from said CPU to said phase controller through said phase control data memory as phase control data, wherein said phase controller controls a phase delay amount for a clock pulse in accordance with the phase control data, supplies the phase-controlled clock pulse to an A/D converter as a sampling pulse, such that said A/D converter samples an analog video input signal at an optimal phase to convert the analog video input signal to a digital video signal, said digital video signal being supplied to a digital video signal processor, said digital video signal processor performing a color correction and a scaling processing on the digital video signal to convert the digital video signal to a digital video signal for display on a display unit, said display unit displaying the digital video signal as a video image.

* * * * *